US006325312B1

(12) United States Patent
Karkos, Jr.

(10) Patent No.: US 6,325,312 B1
(45) Date of Patent: Dec. 4, 2001

(54) INSERTION GUIDE CONSTRUCTION FOR A FOOD PROCESSOR RECEPTACLE

(75) Inventor: John F. Karkos, Jr., Lisbon Falls, ME (US)

(73) Assignee: Island Oasis Frozen Cocktail Company, Inc., Walpole, MA (US)

( * ) Notice: Subject to any disclaimer, the term of this patent is extended or adjusted under 35 U.S.C. 154(b) by 0 days.

(21) Appl. No.: 09/312,107

(22) Filed: May 14, 1999

(51) Int. Cl.⁷ .................................................. B02B 7/02
(52) U.S. Cl. ................................................... 241/100
(58) Field of Search ............................ 241/100, DIG. 17

(56) References Cited

U.S. PATENT DOCUMENTS

| D. 248,080 | * | 6/1978 | Maejima | D7/155 |
| D. 248,159 | * | 6/1978 | Maejima | D15/100 |
| 2,071,730 | * | 2/1937 | Coventry | 83/63 |
| 3,679,140 | * | 7/1972 | Kaishita et al. | 241/95 |
| 4,531,046 | * | 7/1985 | Stover | 219/297 |
| 4,919,075 | * | 4/1990 | Himi | 118/699 |
| 5,007,591 | * | 4/1991 | Daniels, Jr. | 241/37.5 |
| 5,402,949 | * | 4/1995 | Berner et al. | 241/101.2 |
| 5,503,060 | * | 4/1996 | Morecroft et al. | 99/295 |
| 6,012,660 | * | 1/2000 | Colman | 241/30 |

* cited by examiner

Primary Examiner—Allen M. Ostrager
Assistant Examiner—William Hong
(74) Attorney, Agent, or Firm—Foley, Hoag & Eliot LLP

(57) ABSTRACT

In a food processing machine, a removable food receptacle and a platform on which the receptacle is positioned in the machine, are constructed so that the food receptacle, as it is introduced into the machine, is guided into proper position. The platform is provided with a raised shoulder that includes a portion that is contacted by the receptacle when inserted into the machine in an improper direction, and that causes the receptacle to turn to the proper direction. The raised shoulder further includes a portion to stop the receptacle from further insertion once it is in proper position, and portions to maintain the receptacle in proper orientation on the platform during processing and/or delivery of food.

10 Claims, 4 Drawing Sheets

INSERTION GUIDE CONSTRUCTION FOR A FOOD PROCESSOR RECEPTACLE

FIELD OF THE INVENTION

This invention relates to machines for cutting or processing food, and particularly to machines having a removable food receptacle in which food is processed and/or into which processed food is delivered by the machine.

BACKGROUND OF THE INVENTION

One food processing machine that includes a removable food receptacle is an ice-shaver/blender machine described in pending U.S. patent application Ser. No. 09/228/377, now U.S. Pat. No. 6,095,667, assigned to Island Oasis Frozen Cocktail Company, Inc., the assignee of this application. In that machine, ice in the form of cubes or chips is contained in a hopper at the top of the machine, the cubes or chips being driven into contact with a shaving blade to produce shaved ice. The shaved ice is delivered to a removable receptacle or blender cup, where it is blended with other drink ingredients to make a frozen drink.

In the Island Oasis ice-shaver/blender machine described in that application, the impeller in the blender cup is rotated by a magnetic drive, rather than by the conventional gear-and-motor arrangement found in a typical blender. A d.c. motor assembly located under the blender platform and within the machine causes rotation of a magnetizable disk housed in the base of the blender cup and affixed to a shaft. An impeller located within the blender cup receptacle and axially connected to the shaft, is thus likewise rotated to blend the ingredients in the cup. Unlike in conventional ice-shaver/blender machines, the base of the blender cup in the Island Oasis machine has a flat bottom, and the blender platform on which it is positioned in the machine comprises a flat surface. Instead of having to carefully seat a conventional blender cup onto the coupling mechanism of a conventional machine with a downward motion, the operator may position the blender cup of the new Island Oasis ice-shaver/blender into place in the machine simply by grasping the handle of the blender cup and sliding the cup horizontally into position in the machine. In the Island Oasis machine, the act of positioning the blender cup into the machine causes a semi-rigid cover to seat itself on and partly within the top of the receptacle to prevent splashing or other unwanted discharge of food from the receptacle, and causes the cover to be unseated from the receptacle when the receptacle is removed from the machine.

It is crucial that the blender cup be positioned properly and accurately on the blender platform in order that the magnetic motor may drive the magnetizable disk most efficiently. Indeed, if the blender cup is sufficiently out of position, the blender motor may not operate.

It is therefore an object of the present invention to provide a construction that will facilitate the proper positioning of a food receptacle in a food processing machine.

It is a further object of the present invention to provide such a construction that will maintain the food receptacle in proper orientation during receipt of processed food from the machine and/or during processing of food in the receptacle.

It is a still further object of the present invention to provide such a construction that is relatively convenient to use, simple to manufacture, and easy to clean and maintain.

SUMMARY OF THE INVENTION

In a food processing machine, a removable food receptacle and a platform on which the receptacle is positioned in the machine, are constructed so that the food receptacle, as it is introduced into the machine, is guided into proper position. Preferably, the platform is provided with a raised shoulder that includes portions that are contacted by the receptacle when it is inserted into the machine in an improper direction, and cause the receptacle to turn to the proper direction. The raised shoulder further includes portions to stop the receptacle from further insertion once it is in proper position, and portions to maintain the receptacle in proper orientation on the platform during processing and/or delivery of food.

DETAILED DESCRIPTION OF THE INVENTION

Figure 1:
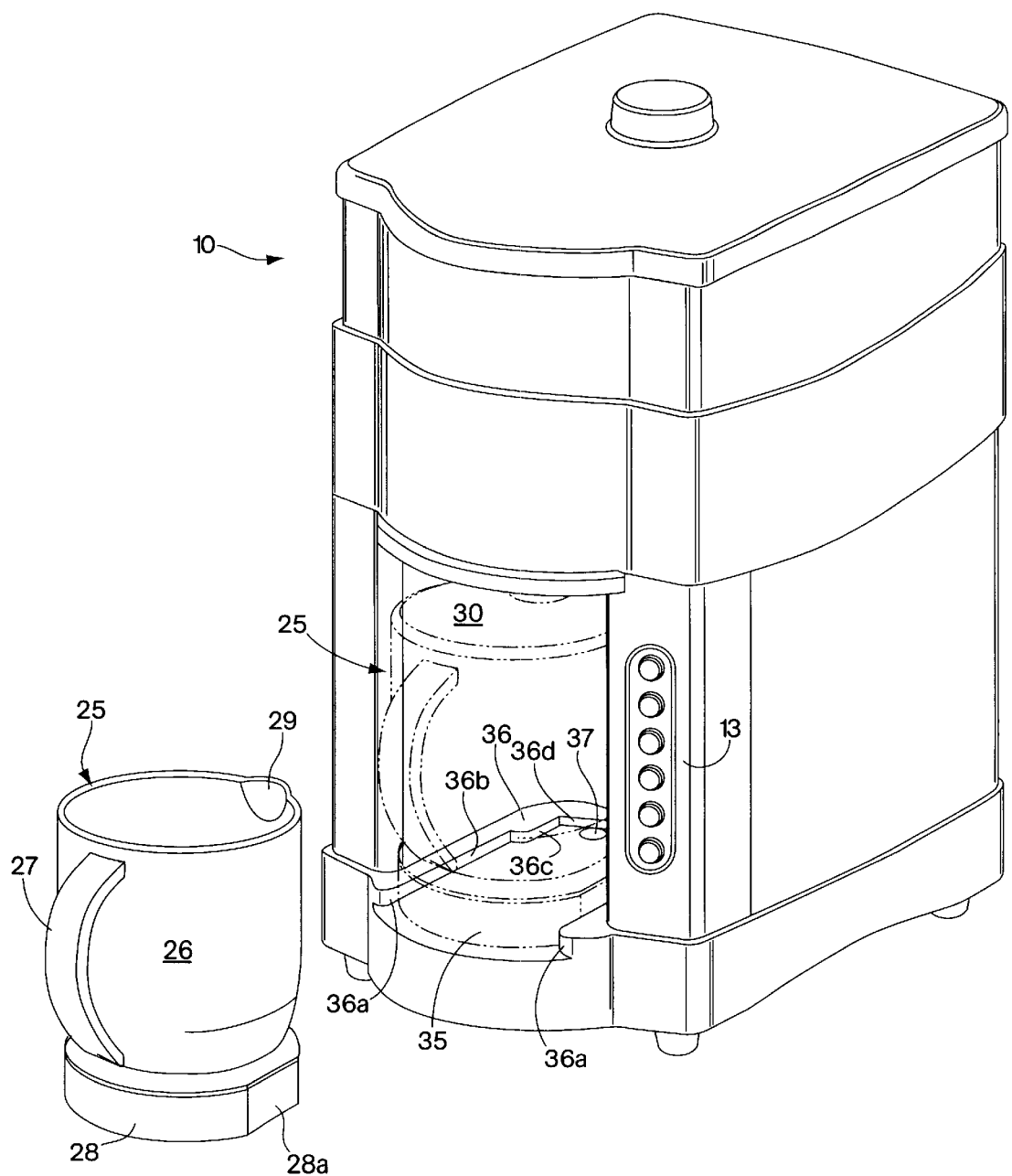
FIG. 1 is a perspective view of an ice-shaver/blender machine and a blender cup, and illustrating in dashed line the final position of the blender cup when mounted in the machine.
Figure 2:
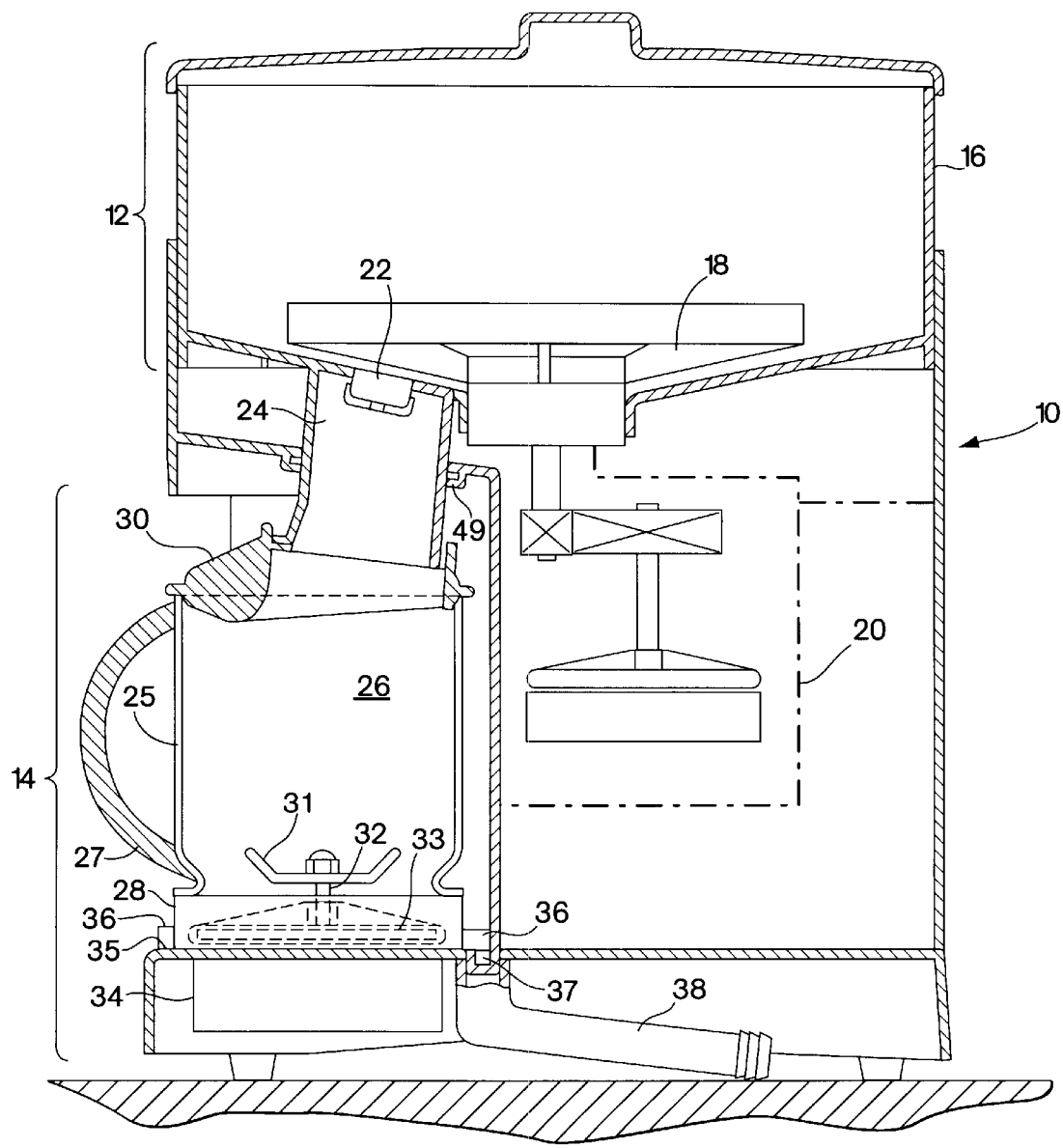
FIG. 2 is a sectional view of the ice-shaver/blender machine of FIG. 1, showing the blender cup in final position on the blender platform.
Figure 4A:
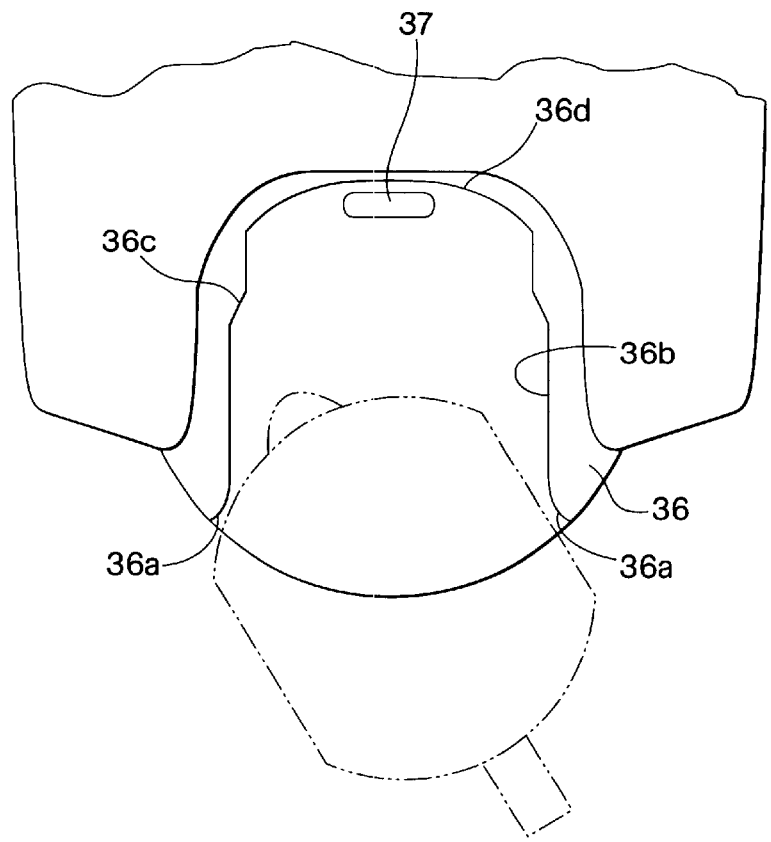
FIGS. 4a to 4c provide an illustration of how the blender cup is guided into proper final position by the construction of the instant invention, as the cup is thrust toward the back of the machine.

Machine 10 for making frozen drinks, depicted in FIGS. 1 and 2, comprises an ice shaver shown generally at 12, mounted above a blender assembly shown generally at 14. A blender cup 25 may be positioned into machine 10 by sliding the base 28 of the blender cup toward the back of the machine on blender platform 35. As illustrated in FIGS. 1 and 4a, a shoulder 36 projecting upwardly around the perimeter of blender platform 35 has rounded outer ends 36a that cooperate with a flat area 28a on each side of blender cup base 28 to guide blender cup 25 into proper position as it is slid into the machine. The shoulder 36 further includes inwardly curved portions 36c on each side near the back of platform to serve as a stop against further inward movement of blender cup 25, thereby ensuring proper final positioning of the cup under ice chute 24. A drain hole 37 at the rear of blender platform 35 allows any spilled liquid to drain off into drainage hose 38.

Push-button control panel 13 electronically controls the operation of the machine. Ice in the form of cubes or chips contained in hopper 16 (FIG. 2) is driven by rotating pusher blade 18 connected to motor 20, the ice cubes or chips striking shaving blade 22, all in known fashion. The shaved ice particles travel through attached ice chute 24 into blender cup 25 though an aperture in the cover 30 seated on blender cup 25. D.c. motor 34 causes magnetizable disk 33, housed in blender cup base 28 and axially attached to rotatable shaft 32, to rotate, causing impeller 31 attached to shaft 32 to likewise rotate within container 26 of blender cup 25, to blend the shaved ice particles and other drink ingredients that have been introduced into the blender cup. Upon completion of the desired blending, blender cup 25 may be removed from the machine, and the blended drink served to customers.

Figure 3:
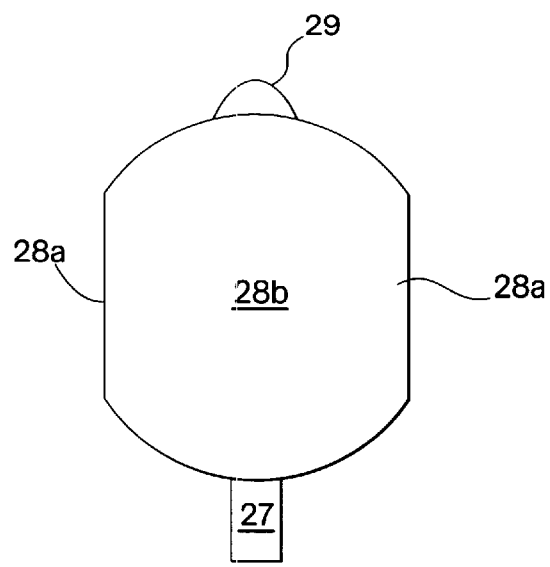
FIG. 3 is a bottom view of the base of the blender cup, showing the flat areas on each side of the base.

The instant invention is directed to an insertion guide construction that includes shoulder 36 extending upwardly around the periphery of blender platform 35, as shown in FIG. 1. Shoulder 36 includes an outwardly rounded front portion 36a on each side of the platform, parallel straight sections 36b on opposite sides of the platform, an inwardly rounded portion 36c on each side, and a u-shaped portion 36d at the rear of the platform. Blender cup 25 comprises container 26 mounted atop base 28, the container 26 housing the impeller 31 (FIG. 2) and receiving the shaved ice, the base 28 being sealed from container 26 and housing the rotatable magnetizable disk 33 that is rotated by de motor 34 mounted under blender platform 35. Base 28 of blender cup 25 is preferably molded of rigid plastic, as is blender platform 35 and shoulder 36. As seen in FIGS. 1 and 3, blender cup base 28 includes a flat surface 28a on each side, which flat surface is parallel to a vertical plane through the center of handle 27 and of blender cup spout 29—i.e., parallel to the vertical plane symmetrically bisecting the blender cup. As explained below, these flat surfaces 28a, in cooperation with shoulder 36, serve to guide the cup into proper position within machine 10 as flat bottom surface 28b is slid along blender platform 35.

Figure 4B:
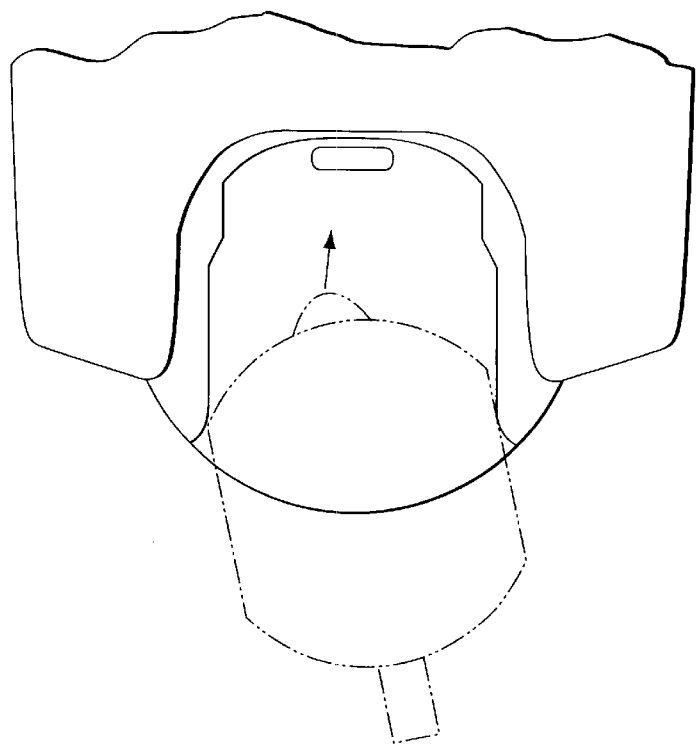
Figure 4C:
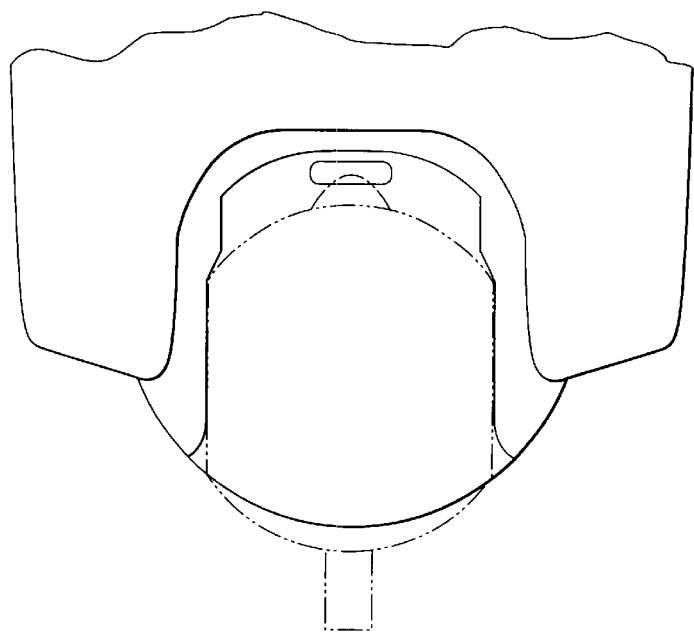

If the blender cup 25 is not inserted directly toward the back of the machine, but rather is inserted at an angle, rounded shoulder portions 36a help turn the blender cup to the proper direction as the blender cup is thrust toward the back of the machine. As may be seen in FIGS. 4a through 4c, first a rounded portion of blender cup base 28a will contact rounded shoulder portion 36a, and as the blender cup is pushed toward the back of the machine cup 25 will be turned toward its proper position as the blender base 28 contacts rounded portion 36a. When the front of the cup reaches proper position, base 28 will contact inwardly rounded shoulder portions 36c, which act as stops to prevent the cup from proceeding any farther toward the back of the machine.

The distance between flat surfaces 28a on base 28 is only slightly less than the distance between flat portions 36b on shoulder 35. Thus, once the blender cup is slid into place on blender platform 35, flat portions 35b serve to prevent rotational movement of the blender cup 28 as the impeller 31 is rotated to blend the ingredients in the cup.

In the particular embodiment here depicted, container 26 of blender cup 25 has an outer diameter of 5¾ inches. Including base 28, the blender cup is 8 inches tall. The base is about 1½ inches high and 5½ inches in diameter at its rounded portion. The distance between flat areas 28a is 5 inches, and each flat area is about 2¼ inches long.

Shoulder 36 is about ⅜ of an inch high. The distance between straight sections 36b is about 5 and ⅛ inches, leaving a 1/16 inch clearance on either side for blender base 28. Thus the only way blender cup 25 may be positioned within ice-shaver/blender 10 is with flat areas 28a of the blender cup parallel with straight sections 36b. The straight sections 36b are about 3 inches long. The distance from the front of platform 35 to the rear section 36d of shoulder 36 is about 7 inches.

It will be readily appreciated by those skilled in the art that the present invention in its broader aspects is not limited to the specific embodiments herein shown and described. Accordingly, variations may be made from the embodiments described herein which are within the scope of the accompanying claims, without departing from the principles of the invention and without sacrificing its chief advantages.

I claim:

1. In a food processing apparatus including a base unit and a removable receptacle for receiving and/or processing food, the base unit including a platform on which the receptacle is to positioned, the improvement comprising insertion guide means for guiding the receptacle into proper position on the platform, said guide means comprising a raised shoulder extending upwardly from said platform, said shoulder being shaped to guide the receptacle into proper position as it is thrust along said platform into the base unit, wherein said raised shoulder includes a portion that is contacted by the receptacle when it is introduced into the machine in an improper direction, and that causes the receptacle to turn in the proper direction.

2. The apparatus of claim 1, wherein said raised shoulder includes, a portion to stop the receptacle from further insertion once it is in proper position, and a portion to maintain the receptacle in proper orientation on the platform during processing and/or delivery of food.

3. The apparatus of claim 2, wherein said receptacle includes a base having flat sides parallel to the desired direction of insertion, and the portion of said raised shoulder that maintains the receptacle in proper orientation comprises two straight sections on opposite sides of the platform and parallel to the proper direction of insertion, the straight sections being spaced apart by a distance slightly greater than the distance between the flat sides of the receptacle base so that, once the receptacle is in proper position on the platform the straight sections cooperate with the flat sides to prevent any substantial rotation or other sideways movement of the receptacle.

4. The apparatus of claim 2, wherein the portion of said raised shoulder that contacts the receptacle when it is inserted into the machine in an improper direction comprises an outwardly rounded section, and wherein said receptacle base includes a curved portion such that, when said curved portion contacts one of said rounded sections as the receptacle is thrust into position, the leading portion of the receptacle is caused to turn toward the back of the machine.

5. The apparatus of claim 3, wherein the portion of said raised shoulder that contacts the receptacle when it is inserted into the machine in an improper direction comprise an outwardly rounded section, and wherein said receptacle base includes a curved portion such that, when said curved portion contacts one of said rounded sections as the receptacle is thrust into position, the leading portion of the receptacle is caused to turn toward the back of the machine.

6. The apparatus of claim 3 wherein said portion that stops the receptacle from further insertion into the machine once it is in proper position comprises an outwardly rounded section toward the rear of the platform, said outwardly rounded section being contacted by the front portion of said receptacle base.

7. The apparatus of claim 4, wherein said portion that stops the receptacle from further insertion into the machine once it is in proper position comprises an outwardly rounded section toward the rear of the platform, said outwardly rounded section being contacted by the front portion of said receptacle base.

8. The apparatus of claim 5, wherein said portion that stops the receptacle from further insertion into the machine once it is in proper position comprises an outwardly rounded section toward the rear of the platform, said outwardly rounded section being contacted by the front portion of said receptacle base.

9. The apparatus of claim 2 wherein said platform comprises a flat surface, and said receptacle has a flat bottom.

10. The apparatus of claim 3 wherein said platform comprises a flat surface, and said receptacle has a flat bottom.

* * * * *

UNITED STATES PATENT AND TRADEMARK OFFICE
CERTIFICATE OF CORRECTION

PATENT NO.    : 6,325,312 B1
DATED         : December 4, 2001
INVENTOR(S)   : John F. Karkos, Jr.

It is certified that error appears in the above-identified patent and that said Letters Patent is hereby corrected as shown below:

<u>Column 4,</u>
Line 30, replace "machine" with -- base unit --.
Line 35, replace "machine" with -- base unit --.
Line 38, replace "machine" with -- base unit --.
Line 43, replace "machine" with -- base unit --.
Line 45, replace "machine" with -- base unit --.
Line 51, replace "machine" with -- base unit --.
Line 57, replace "machine" with -- base unit --.

Signed and Sealed this

Second Day of July, 2002

*Attest:*

JAMES E. ROGAN
*Attesting Officer*    *Director of the United States Patent and Trademark Office*